United States Patent [19]
Oliver, Jr. et al.

[11] Patent Number: 5,948,027
[45] Date of Patent: Sep. 7, 1999

[54] METHOD FOR ENHANCING VEHICLE STABILITY

[75] Inventors: John Allen Oliver, Jr., Canton; Michael Barry Goran, Bloomfield Hills; Steven John Ferrari, Troy, all of Mich.

[73] Assignee: Ford Global Technologies, Inc., Dearborn, Mich.

[21] Appl. No.: 08/709,029

[22] Filed: Sep. 6, 1996

[51] Int. Cl.$^6$ ............................................. B60G 17/015
[52] U.S. Cl. ..................... 701/37; 701/38; 280/5.506; 280/5.507; 280/5.51
[58] Field of Search ..................... 701/37, 38, 48; 280/5.506, 5.507, 5.51, 5.515, 6.151, 6.159

[56] References Cited

U.S. PATENT DOCUMENTS

| | | | |
|---|---|---|---|
| 4,267,736 | 5/1981 | Westbeck | 74/5.22 |
| 4,844,506 | 7/1989 | Moriguchi et al. | 280/689 |
| 5,508,929 | 4/1996 | Harada | 280/707 |
| 5,521,828 | 5/1996 | Akita et al. | 701/36 |
| 5,684,698 | 11/1997 | Fujita et al. | 280/6.159 |
| 5,701,245 | 12/1997 | Ogawa et al. | 280/707 |
| 5,732,371 | 3/1998 | Fujita | 701/38 |
| 5,822,709 | 10/1998 | Fujita | 701/70 |
| 5,828,970 | 10/1998 | Kimura et al. | 701/37 |

OTHER PUBLICATIONS

"The Influence of Lateral Load Transfer Distribution on Directional Response", by Chris L. Clover et al, SAE Technical Paper No. 930763, pp. 45–51. (No Date).

"Influence of Active Suspensions on the Handling Behaviour of Vehicles—Experimental and Theoretical Results", by G. Keuper et al, SAE Technical Paper No. 945061, pp. 1–10. (No Date).

"Nonlinear Control of Roll Moment Distribution to Influence Vehicle Yaw Characteristics", by Daniel E. Williams et al, IEEE Transactions on Control Systems Technology vol. 3, No. 1, Mar. 1995.

*Primary Examiner*—Lissi Mojica
*Attorney, Agent, or Firm*—Gregory P. Brown; Roger L. May

[57] ABSTRACT

A method of enhancing vehicle stability and response in a vehicle having an active roll control system with front and rear suspensions each including an anti-roll bar, and the control system including a hydraulic system for providing an anti-roll moment which acts on the vehicle by means of hydraulic cylinders connected to the anti-roll bars, includes the following steps: a) determining the vehicle speed; b) determining the steering wheel angle; c) calculating the desired vehicle yaw rate based upon the determined speed and steering wheel angle; d) sensing the actual yaw rate; e) comparing the desired yaw rate to the actual yaw rate; f) increasing the percentage of the anti-roll moment provided to the rear anti-roll bar if the actual yaw rate is less than the desired yaw rate, thereby decreasing understeer, increasing yaw rate, and enhancing vehicle response; and g) increasing the percentage of the anti-roll moment provided to the front anti-roll bar if the actual yaw rate is greater than the desired yaw rate, thereby increasing understeer, decreasing yaw rate, and enhancing vehicle stability. The anti-roll moment distribution is further adjusted for steering precision enhancement.

6 Claims, 3 Drawing Sheets

5,948,027

METHOD FOR ENHANCING VEHICLE STABILITY

TECHNICAL FIELD

The present invention relates to vehicle stabilizers, and more particularly to a method of adjusting vehicle stabilizers for enhancing vehicle stability, response, and steering precision.

BACKGROUND OF THE INVENTION

Automotive vehicles having independent suspensions are generally equipped with stabilizers to reduce roll of the vehicle bodies during vehicle turns. It is possible for vehicles with solid axles to have stabilizer bars as well. The stabilizer is usually connected between the suspension arms of the wheels. When the left and right wheels are in similar positions with respect to the vehicle body, the stabilizer does not twist so that the suspensions are mutually independent. When the left or right hand wheel passes over a projection on the road surface, or when the vehicle turns and thus the left hand wheel and the right hand wheel assume different positions with respect to the vehicle body, the torsion bar is twisted. The reaction of the twisted stabilizer bar induces a torsional resilient force on the vehicle body in a direction so that the positions of the two wheels with respect to the vehicle body tend to be equalized. In this manner, the stabilizer may affect the rolling characteristics of the vehicle.

In a vehicle turn, the vehicle's stability may be changed as load is transferred laterally from one wheel to the other and cornering capability is lost.

It is desirable to control such load transfer in a manner to improve vehicle stability and enhance steering precision.

SUMMARY OF THE INVENTION

The present invention provides a method of enhancing vehicle stability in a vehicle having an active roll control system with front and rear suspensions each including an anti-roll bar, and the control system being capable of providing an adjustable anti-roll moment at the front and rear anti-roll bars. The method comprises: a) determining the vehicle speed; b) determining the steering wheel angle; c) calculating the desired vehicle yaw rate based upon the determined speed and steering wheel angle; d) sensing the actual yaw rate; e) comparing the desired yaw rate to the actual yaw rate; f) increasing the percentage of the anti-roll moment provided at the rear anti-roll bar if the actual yaw rate is less than the desired yaw rate, thereby decreasing understeer and increasing yaw rate; and g) increasing the percentage of the anti-roll moment provided to the front anti-roll bar if the actual yaw rate is greater than the desired yaw rate, thereby increasing understeer and decreasing yaw rate. In this manner, actual yaw rate will more closely track desired yaw rate, thus enhancing vehicle response and stability.

The method may further comprise enhancing steering precision by adjusting the distribution of anti-roll moment between the front and rear anti-roll bars based upon the gain-adjusted difference between the desired and actual yaw rates.

Accordingly, an object of the present invention is to provide a closed loop method of enhancing vehicle stability using an active roll control system, and adjusting anti-roll moment distribution between the front and rear anti-roll bars based upon vehicle speed, steering wheel angle, and measured yaw rate.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Typically, active roll control systems are implemented to reduce or eliminate vehicle body roll while maneuvering. The system produces hydraulic pressures which act on the vehicle by means of hydraulic cylinders that connect to the vehicle's anti-roll bars. The overall anti-roll moment that must be produced by the system is directly proportional to lateral acceleration, which is measured on the vehicle. The total anti-roll moment must then be distributed between the front and rear anti-roll bars.

Such an active roll control system may include a single, electronically-controlled pressure control valve. In such a system, the same hydraulic pressure acts on both the front and rear anti-roll bar cylinders. The front-to-rear roll couple distribution in such a system is determined by the physical parameters of the system, such as hydraulic cylinder bores, strokes, and anti-roll bar stiffnesses. An alternative system architecture could use two pressure control valves. One valve produces hydraulic pressure to act on the front anti-roll bar cylinder, and the other produces hydraulic pressure to act on the rear anti-roll bard cylinder. In such a system, the front-to-rear roll couple distribution can additionally be varied by changing the relative front and rear hydraulic pressures.

The present invention provides the capability of adjusting anti-roll moment distribution between front and rear anti-roll bars by implementing a closed loop feedback control system which compares desired yaw rate to actual yaw rate and adjusts the anti-roll moment distribution by hydraulic actuation of the stabilizer cylinders in the front and rear roll bars. For example, if the vehicle is cornering, and the yaw rate is greater than desired, the control system will apportion a greater percentage of anti-roll moment to the front anti-roll bar and reduce the percentage of the anti-roll moment apportioned to the rear anti-roll bar, by increasing the hydraulic pressure acting on the front anti-roll bar cylinder and decreasing the hydraulic pressure acting on the rear anti-roll bar cylinder, thereby increasing understeer and decreasing yaw rate. In this manner, the yaw rate may be adjusted by controlling relative roll moments of front and rear anti-roll bar assemblies.

Figure 1:
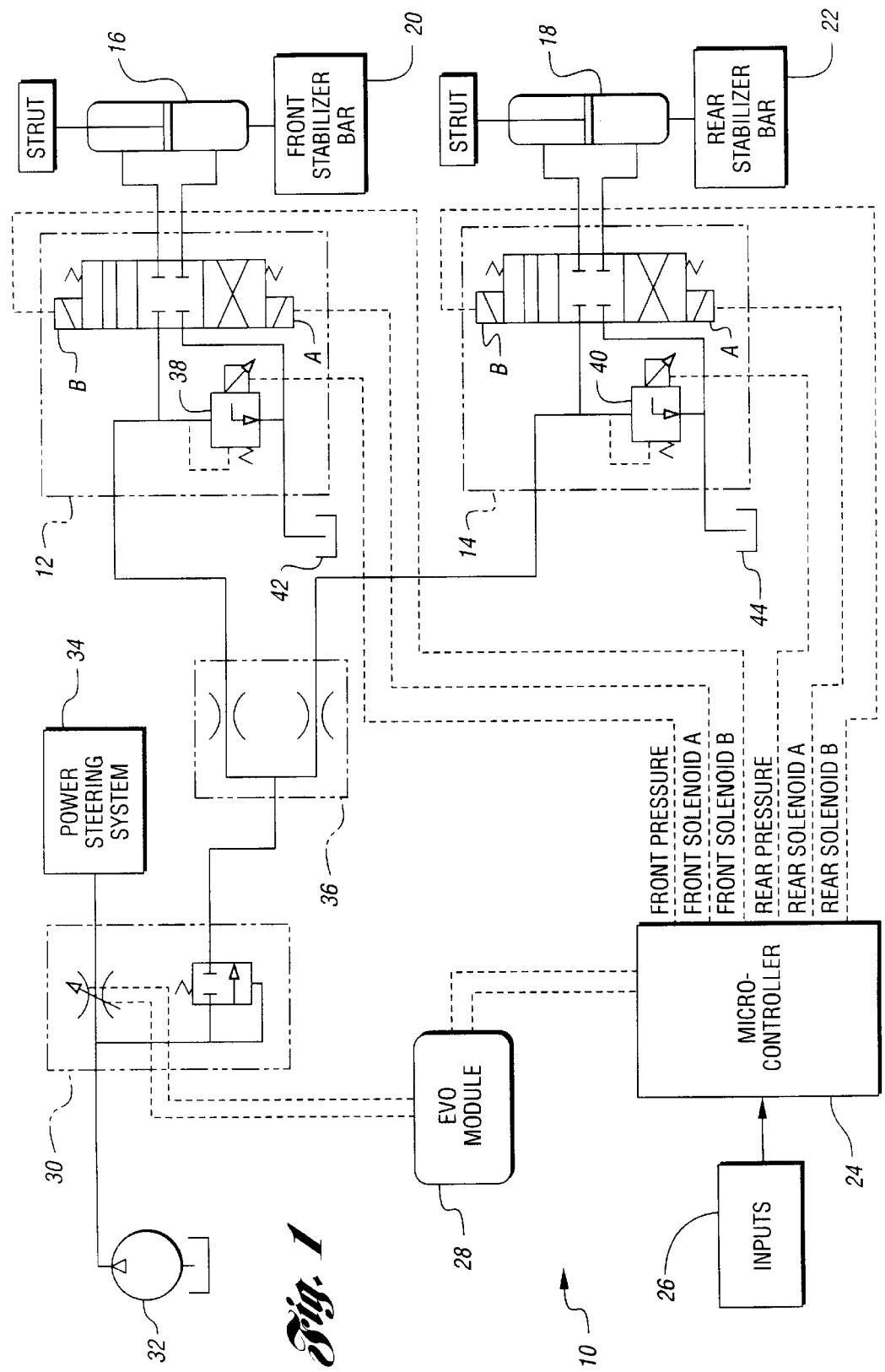
FIG. 1 shows a flow diagram of a control system for implementing the method in accordance with the present invention.
Figure 2:
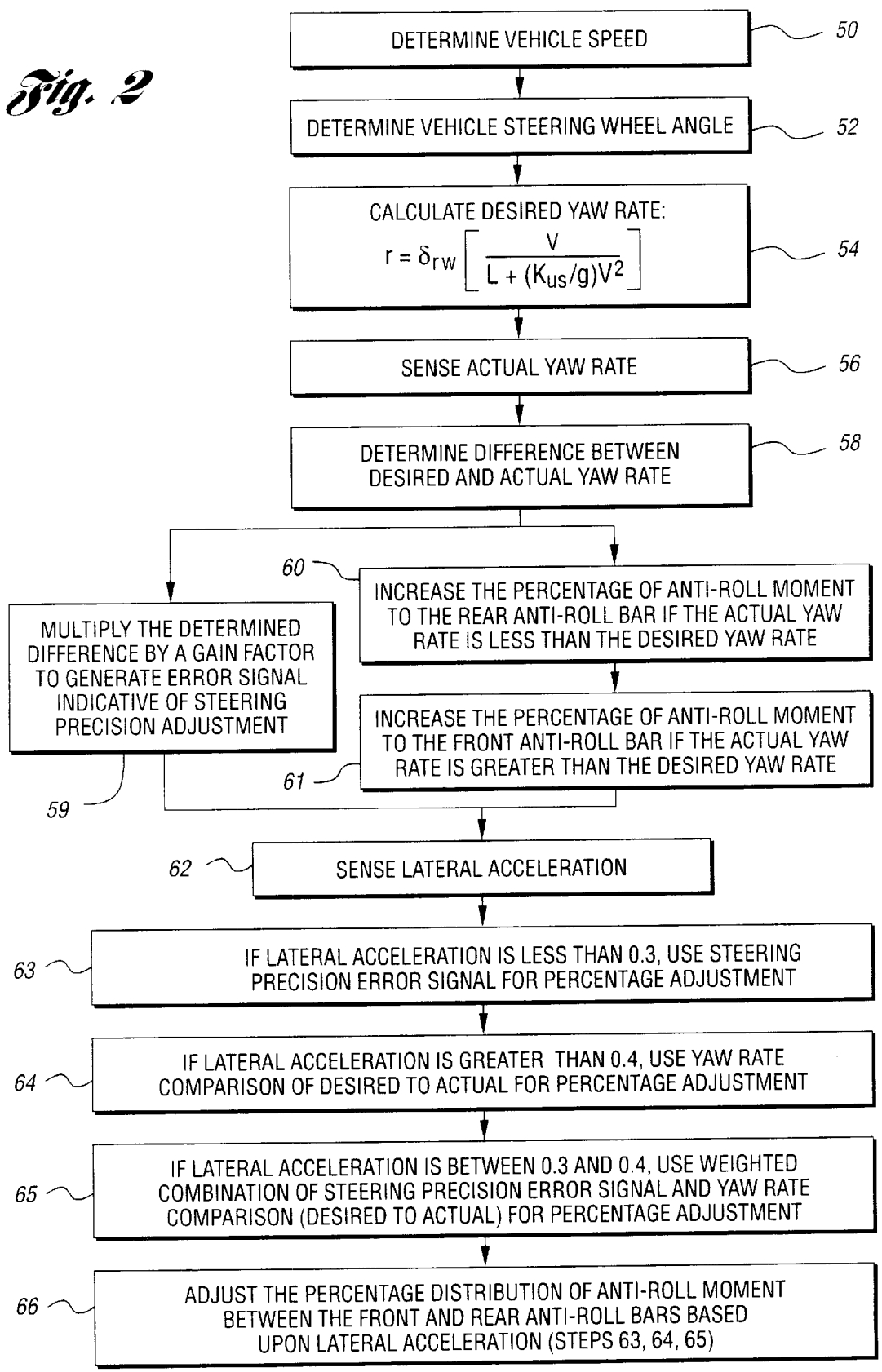
FIG. 2 shows a flow diagram illustration of a method of enhancing vehicle stability and steering precision in accordance with the method of FIG. 1.
Figure 3:
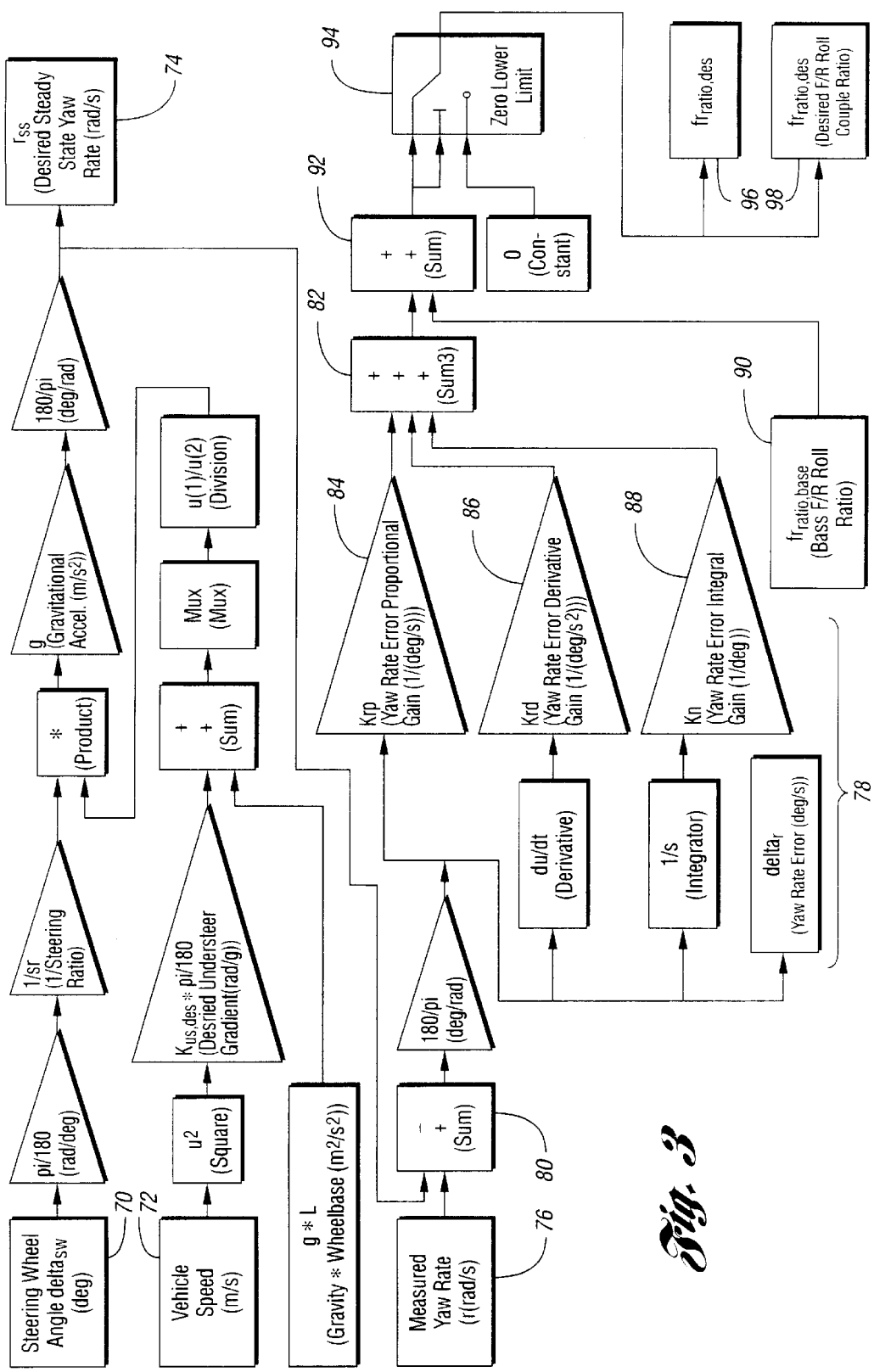
FIG. 3 shows a block diagram for implementing the method of FIG. 1.

The method of enhancing vehicle stability is described in the flowcharts of FIGS. 1–3.

Referring to FIG. 1, an active roll control system 10 is shown. The control system 10 includes two separate pressure control valves 12,14. In this configuration, different pressures can be produced in the front and rear hydraulic cylinders 16,18. By varying the relationship of the front and rear pressures, the roll couple distribution can be altered from having all of the anti-roll moment on the front stabilizer bar 20 (anti-roll bar) or all of the anti-roll moment on the rear stabilizer bar 22 (anti-roll bar), and any distribution between these two extremes, without altering the total anti-roll moment, which is maintained at the level required to counteract vehicle body roll.

The control system 10 of FIG. 1 includes a microcontroller 24 which is used for implementing the method described below with reference to FIG. 2. The microcontroller 24 is provided with several inputs 26 for calculations and cylinder adjustment signal generation. These inputs include steering wheel rate, steering wheel angle, vehicle speed, longitudinal acceleration, lateral acceleration, right front wheel height, left front wheel height, front cylinder displacement, rear cylinder displacement, yaw rate, roll rate, roll acceleration, front cylinder pressure, and rear cylinder pressure. In the preferred embodiment, the microcontroller interfaces with an electronically variable orifice (EVO) module 28, which operates the electronically variable orifice priority valve 30. The EVO priority valve 30 receives pressurized fluid from pump 32, and apportions the fluid supply between the power steering system 34 and the stabilizer hydraulic cylinders 16,18. The fluid supply enters a flow divider 36, where the flow is split between front and rear cylinders 16,18. The flow divider 36 typically provides a base 50/50 or 60/40 split between front and rear cylinders. The front and rear control valves 12,14 each include a pressure control valve 38,40, engaged with reservoirs 42,44, respectively, and opposing solenoids A,B interfaced with the micro-controller 24 for operating the respective cylinder 16,18 in desired directions for adjusting stabilizer stiffnesses.

The flowchart of FIG. 2 illustrates the method of the present invention for enhancing vehicle stability and improving steering precision. The method comprises the following steps: a) determining the vehicle speed (step 50); b) determining the steering wheel angle (step 52); c) calculating the desired vehicle yaw rate (step 54); d) sensing the actual yaw rate (terms of which are described later in the specification) (step 56); e) determining the difference between desired and actual yaw rate (step 58); f) multiplying the determined difference by a gain factor to generate error signal indicative of steering precision adjustment (step 59); g) increasing the percentage of the anti-roll moment to the rear anti-roll bar if the actual yaw rate is less than the desired yaw rate (step 60); h) increasing the percentage of the anti-roll moment to the front anti-roll bar if the actual yaw rate is greater than the desired yaw rate (step 61); i) sensing lateral acceleration (step 62); j) if lateral acceleration is less than 0.3, using steering precision error signal for percentage adjustments (step 63); k) if lateral acceleration is greater than 0.4, using yaw rate comparison (desired to actual) for percentage adjustment (step 64); l) if lateral acceleration is between 0.3 and 0.4, using a weighted combination of steering precision error signal and yaw rate comparison (desired to actual) for percentage adjustment (step 65); and m) adjusting the percentage distribution of anti-roll moment between the front and rear anti-roll bars based upon lateral acceleration (step 66). The steering precision adjustment steps 64 and 66 are discussed later in the detailed description.

The desired yaw rate is calculated in accordance with the following formula (step 54):

$$r = \delta_{rw}\left[\frac{V}{L + (K_{us}/g)V^2}\right];$$

where
r is the desired yaw rate, $\delta_{rw}$ is the road wheel angle (which is directly proportional to steering wheel angle), V is the vehicle velocity, L is the wheel base length, $K_{us}$ is the desired understeer coefficient, and g is the acceleration of gravity.

Because of the non-linear behavior or pneumatic tires, changing the roll couple distribution of a vehicle changes its understeer characteristics. This fact is exploited in order to determine the desired roll couple distribution by using closed loop yaw rate feedback. The controller calculates the desired vehicle yaw rate from the vehicle speed and steering wheel angle or road wheel angle, as described above, and compares this desired value with the actual measured vehicle yaw rate. If the vehicle is yawing less than desired, the controller commands a greater proportion of the anti-roll moment to be generated at the rear axle, decreasing understeer and thereby increasing yaw rate. If the vehicle is yawing more than desired, the controller commands a greater portion of the anti-roll moment to be generated at the front axle, thus increasing understeer and decreasing yaw rate. By implementing feedback control on the yaw rate error signal, the desired yaw rate and understeer behavior of the vehicle can be achieved.

FIG. 3 illustrates a block diagram implementing the yaw rate control strategy. The upper portion of the diagram (blocks 70 and 72 thru block 74) illustrates the desired yaw rate calculation. The steering wheel angle 70 and vehicle speed 72 are input into the control scheme and the various operators implement the formula described above in order to calculate the desired steady state yaw rate (r). The desired steady state yaw rate is output as a stored variable at block 74. The desired yaw rate is also summed with the measured yaw rate (block 76) and a PID control loop 78 performs closed loop feedback control on the error signal generated at the sum block 80. The entire algorithm, including the PID closed loop control, is performed by a program residing in the micro-controller (24 in FIG. 1). The sum 82 of the error signals, which have each been multiplied by a gain factor (84,86,88), is added with the base roll couple ratio 90 (as dictated by the microcontroller).

This addition at sum block 92 is where the actual adjustment of the anti-roll moment distribution between front and rear stabilizers occurs. The limit block 94 then compares the sum 92 to zero and picks the larger of the two, thereby preventing a negative roll couple ratio. The new desired roll couple distribution, 96, is used to calculate the front and rear hydraulic pressure commands.

Other vehicle responses can be used to control the roll couple distribution as well. For example, in the on-center region (i.e. at slight steer angles), non-linear tire effects are not as is significant as they are at higher lateral accelerations. A different strategy could be used in the on-center region to control roll couple distribution in such a way as to improve steering precision. If the vehicle's lateral acceleration increases and the maneuvering condition changes from the on-center region to the non-linear region (i.e. high steer angle) of the tires, the strategy can change from the low lateral acceleration steering precision control to the higher lateral acceleration yaw rate feedback control. This transition generally occurs at 0.3–0.4 g of lateral acceleration.

The steering precision control adjustment illustrated at steps 64 and 66 of FIG. 2 is used to improve the linearity of the relationship between steering wheel angle and yaw rate by compensating for various compliances in the steering and suspension systems, such as bushing deflection and tire compliances. This compensation is accomplished by adjusting the anti-roll moment distribution. In order to accomplish this, the PID control loop 78 illustrated in FIG. 3 would include an additional gain factor for generating an error signal indicative of steering precision adjustment in pursuit of a linear relationship between steering angle and yaw rate. According to the value of lateral acceleration, this error signal would be weighted and added into the sum 82 of FIG. 3 for further adjustment of the roll couple ratio.

While the best mode for carrying out the invention has been described in detail, those familiar with the art to which this invention relates recognize various alternative designs and embodiments for practicing the invention within the scope of the appended claims.

What is claimed is:

1. A method of enhancing vehicle response and stability in a vehicle having an active roll control system with front and rear suspensions each including an anti-roll bar, and the control system being capable of providing an anti-roll moment on the vehicle which may be proportioned between the front and rear anti-roll bars, the method comprising:
    a) determining the vehicle speed;
    b) determining the steering wheel angle;
    c) calculating the desired vehicle yaw rate based upon the determined speed and steering wheel angle;
    d) sensing the actual yaw rate;
    e) comparing the desired yaw rate to the actual yaw rate;
    f) increasing the percentage of the anti-roll moment provided to the rear anti-roll bar if the actual yaw rate is less than the desired yaw rate, thereby decreasing understeer, increasing yaw rate, and enhancing vehicle response; and
    g) increasing the percentage of the anti-roll moment provided to the front anti-roll bar if the actual yaw rate is greater than the desired yaw rate, thereby increasing understeer, decreasing yaw rate, and enhancing vehicle stability.

2. The method of claim 1, wherein said step of calculating the desired yaw rate comprises implementing the following formula in a closed loop controller:

$$r = \delta_{rw}\left[\frac{V}{L+(K_{us}/g)V^2}\right];$$

where
    r is the desired yaw rate, $\delta_{rw}$ is the road wheel angle (which is directly proportional to steering wheel angle), V is the vehicle velocity, L is the wheel base length, $K_{us}$ is the desired understeer coefficient, and g is the acceleration of gravity.

3. A method of enhancing steering precision in a vehicle having an active roll control system with front and rear suspensions each including an anti-roll bar, and the control system being capable of providing an anti-roll moment on the vehicle which may be proportioned between the front and rear anti-roll bars, the method comprising:
    determining the vehicle speed;
    determining the steering wheel angle;
    calculating the desired vehicle yaw rate based upon the determined speed and steering wheel angle;
    sensing the actual yaw rate;
    comparing the desired yaw rate to the actual yaw rate to determine a difference therebetween;
    multiplying the difference by a gain factor to generate an error signal indicative of steering precision adjustment; and
    adjusting the distribution of anti-roll moment between the front and rear anti-roll bars based upon the error signal, thereby adjusting understeer and yaw rate and enhancing steering precision.

4. The method of claim 3, wherein said step of calculating the desired yaw rate comprises implementing the following formula in a closed loop controller:

$$r = \delta_{rw}\left[\frac{V}{L+(K_{us}/g)V^2}\right];$$

where
    r is the desired yaw rate, $\delta_{rw}$ is the road wheel angle (which is directly proportional to steering wheel angle), V is the vehicle velocity, L is the wheel base length, $K_{us}$ is the understeer coefficient, and g is the acceleration of gravity.

5. A method of enhancing vehicle stability and steering precision in a vehicle having an active roll control system with front and rear suspensions each including an anti-roll bar, and the control system being capable of providing an anti-roll moment on the vehicle which may be proportional between the front and rear anti-roll bars, the method comprising:
    determining the vehicle speed;
    determining the vehicle steering wheel angle;
    calculating the desired vehicle yaw rate based upon the determined speed and steering wheel angle;
    sensing the actual yaw rate;
    comparing the desired yaw rate to the actual yaw rate to determine a difference therebetween;
    increasing the percentage of the anti-roll moment provided to the rear anti-roll bar if the actual yaw rate is less than the desired yaw rate, thereby decreasing understeer and increasing yaw rate;
    increasing the percentage of the anti-roll moment provided to the front anti-roll bar if the actual yaw rate is greater than the desired yaw rate, thereby increasing understeer and decreasing yaw rate;
    multiplying the difference by a gain factor to generate an error signal indicative of steering precision adjustment; and
    adjusting the distribution of anti-roll moment between the front and rear anti-roll bars based upon the error signal, thereby further adjusting understeer and yaw rate and enhancing steering precision.

6. The method of claim 5, wherein said step of calculating the desired yaw rate comprises implementing the following formula in a closed loop controller:

$$r = \delta_{rw}\left[\frac{V}{L+(K_{us}/g)V^2}\right];$$

where
    r is the desired yaw rate, $\delta_{rw}$ is the road wheel angle (which is directly proportional to steering wheel angle), V is the vehicle velocity, L is the wheel base length, $K_{us}$ is the understeer coefficient, and g is the acceleration of gravity.

* * * * *